United States Patent

Baida et al.

[11] Patent Number: 5,279,478
[45] Date of Patent: Jan. 18, 1994

[54] SEEKER CIRCUIT FOR HOMING MISSILE GUIDANCE

[75] Inventors: Seymour Baida; Paul D. Ledbetter, both of Baltimore, Md.

[73] Assignee: Westinghouse Electric Corp., Pittsburgh, Pa.

[21] Appl. No.: 664,709

[22] Filed: Mar. 5, 1991

Related U.S. Application Data

[63] Continuation of Ser. No. 453,743, Dec. 20, 1989, abandoned.

[51] Int. Cl.⁵ .............................................. F41G 7/22
[52] U.S. Cl. ................................................ 244/3.15
[58] Field of Search ...................... 244/3.15, 3.16, 3.19

[56] References Cited

U.S. PATENT DOCUMENTS

| | | | |
|---|---|---|---|
| 2,932,467 | 4/1960 | Scorgie | 244/3.15 |
| 3,735,944 | 5/1973 | Bannett et al. | 244/3.15 |
| 4,456,862 | 6/1984 | Yueh | 244/3.19 |
| 4,502,650 | 3/1985 | Yueh | 244/3.15 |

FOREIGN PATENT DOCUMENTS 231000 9/1989 Japan .................................. 244/3.16

OTHER PUBLICATIONS

*Airborne Radar*, Povesil, Raven, Waterman et al., pp. 483–484 (1961).

*Primary Examiner*—Charles T. Jordan

[57] ABSTRACT

A seeker circuit for homing missile guidance comprising a velocity memory loop and an acceleration memory loop. During the presence of an adequate target data signal, the guidance computer uses a command line-of-sight rate based on velocity components of the actual line-of-sight computed by the velocity memory loop. But, during the absence of an adequate target data signal, estimated line-of-sight rate components of the last actual line-of-sight rate computed by the acceleration memory loop are input to the guidance computer. Further, when the target data signal is fading in and out, a stabilizing means effectively stabilizes both loops.

25 Claims, 3 Drawing Sheets

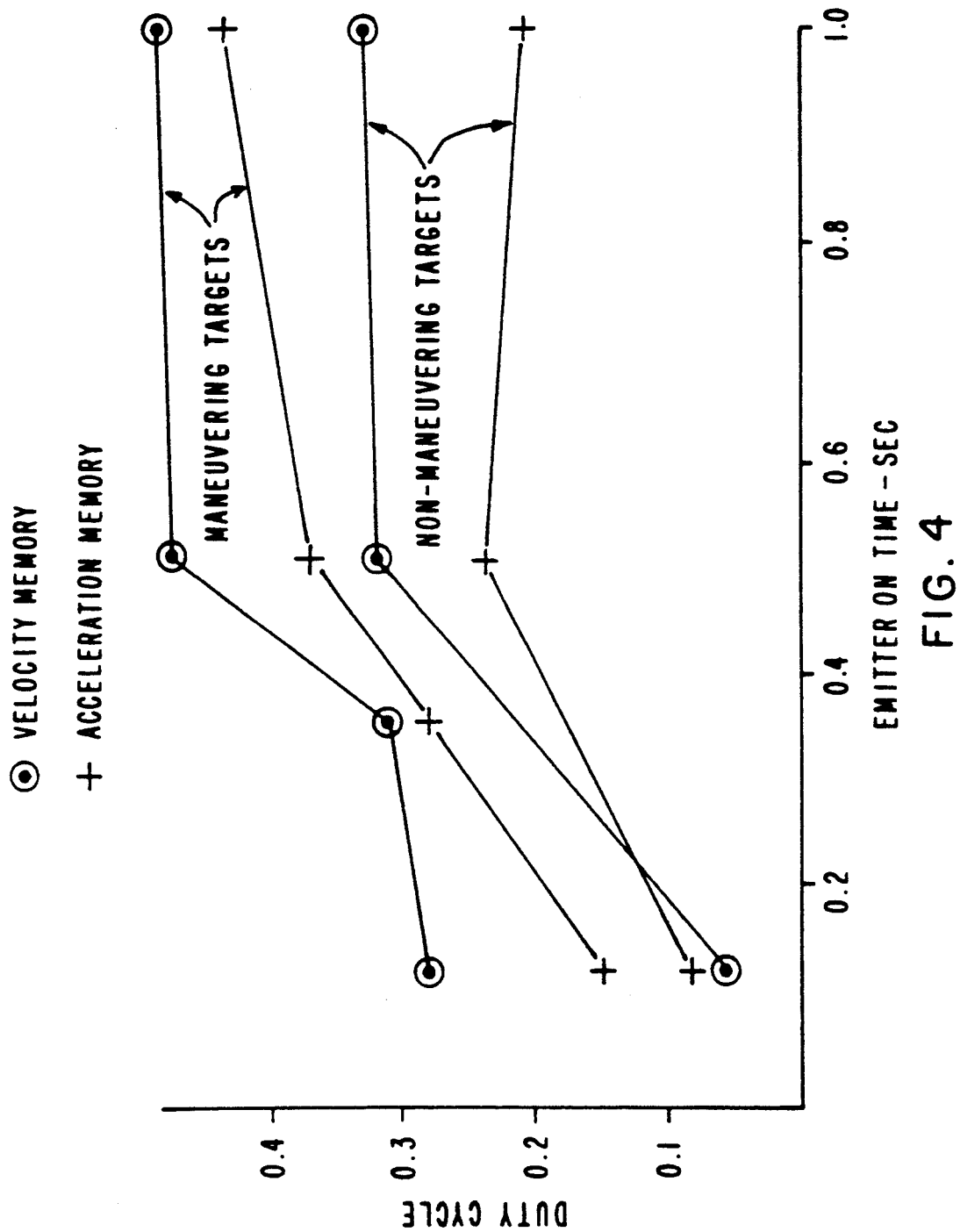

SEEKER CIRCUIT FOR HOMING MISSILE GUIDANCE

This patent is a continuation of Ser. No. 453,743, filed Dec. 20, 1989, now abandoned.

BACKGROUND OF THE INVENTION

1. Field of the Invention

The present invention relates in general to the guidance of a homing missile toward a target. More specifically, the invention is directed to a seeker circuit for passive homing missile guidance. The seeker circuit uses estimated line-of-sight rate components of the last actual line-of-sight rate during the absence of a target signal.

2. Description of Prior Art

Missile guidance performance is a function of the rate at which target data is derived. Missile guidance generally requires a data rate commensurate with the bandwidth of its guidance loop. An inadequate data rate is detrimental to guidance accuracy.

Inadequate data rates may be caused by a number of factors including, but not limited to the following: interference from non-target radar signals, jamming techniques, data starving periodic cessation of radar transmission from the target, and sudden cool spots (for heat seeking guidance systems). Such detriments to the desired data signal may irreparably effect guidance allowing the missile to veer off course.

Data starving is a common means for defending against a missile guidance system. Target data is intermittently denied to the missile by periodically ceasing radar transmission from the target. If the target radiation duty cycle is sufficiently low, the missile is unable to receive target data at a rate required for accurate missile guidance.

To overcome a data starving defense (or any other detriment to the data signal), conventional homing missile guidance systems, and more particularly, missile seekers employ "velocity memory" to coast through periods when target data is being denied. The missile seekers compute velocity components of the last line-of-sight (LOS) signal input prior to data starvation to maintain an approximately accurate course. These velocity components of the line-of-sight are important to guidance because homing missiles commonly use proportional navigation guidance wherein the missile's turning rate is made proportional to the turning rate of the line-of-sight between the missile and its target.

As shown in FIG. 1 (PRIOR ART), a conventional seeker comprises a target detector 30 and a velocity memory loop 10 including an error detection circuit 26, a switch 24, a first integrator 12 and a second integrator 14.

When the target detector 30 detects an adequate data signal, it controls first switch 24 to terminal A. The error detection circuit 26 produces a first error signal 22, which is proportional to the difference between an actual line-of-sight 18 and an estimated line-of-sight 16. The first integrator 12 integrates first error signal 22 to generate a commanded LOS rate signal 20, which is effectively the rate at which the line-of-sight is turning. The commanded LOS rate signal 20 is input to a guidance computer of the missile and is used to drive a missile antenna (not shown) to move along the line-of-sight. To complete the loop, the second integrator 14 further integrates the commanded LOS rate signal 20 to provide the estimated line-of-sight 16 which is fed back to the error detection circuit 26.

During the absence of an adequate data signal (i.e. any detriment previously discussed), target detector 30 controls the first switch 24 to ground terminal B. Thus, the first error signal 22 is forced to zero causing the first integrator 12 to stop integrating. As a result, the last integrated commanded line-of-sight rate signal 20 is preserved, or "memorized" (hence, the name "velocity memory"). This allows the second integrator 14 to continue integrating from this preserved value despite a loss of an adequate data signal.

However, velocity memory is limited in that it only memorizes velocity. Yet, the last line-of-sight may have acceleration components in addition to velocity components. Further, velocity memory has a limited capability of holding an accurate course during longer intervals between adequate signals.

SUMMARY OF THE INVENTION

An object of the present invention is to provide an improved guidance seeker which operates during the absence of an adequate data signal according to the acceleration of the last line-of-sight.

It is a further object of the present invention to provide stability during an intermittent absence of an adequate signal.

Accordingly, the present invention computes a velocity and an acceleration of the line-of-sight. During the presence of an adequate signal, the velocity is input to the guidance computer. On the other hand, during an absence of an adequate data signal, a signal based upon the acceleration of the last integrated line-of-sight is input to the guidance computer. Further, when an adequate signal intermittently fades in and out, the present invention adjusts parameters of the acceleration computation to enhance stability.

Specifically, the present invention comprises a velocity memory loop, an acceleration memory loop, a target detector, and a stabilizing means. The velocity memory loop computes a line-of-sight velocity rate (i.e., rate at which the LOS is turning). The acceleration memory loop computes a line-of-sight acceleration rate (i.e., acceleration at which the LOS is turning). When the target detector detects an adequate data signal, the line-of-sight velocity rate is input to the guidance computer. However, when the target detector fails to detect an adequate data signal, a signal based upon the last computed line-of-sight acceleration rate is integrated and input to the guidance computer. Further, when destabilizing occurs as a result of the data signal fading in and out, the stabilizing means adjusts the parameters of the acceleration loop to stabilize the loop.

The present invention is advantageous to conventional seekers in that it provides acceleration components of the last line-of-sight to the guidance computer and enhances the missile's ability to hold a more accurate course during extended data signal absences.

BRIEF DESCRIPTION OF THE DRAWINGS

These and other advantages will become more apparent from the detailed description of the preferred embodiment along with the following drawings wherein like reference numerals designate like or corresponding parts throughout:

FIG. 4 is a graph illustrating the performance of a conventional seeker and a seeker according to the present invention with regard to duty cycle and emitter on time.

DETAILED DESCRIPTION OF THE PREFERRED EMBODIMENT

Figure 2:
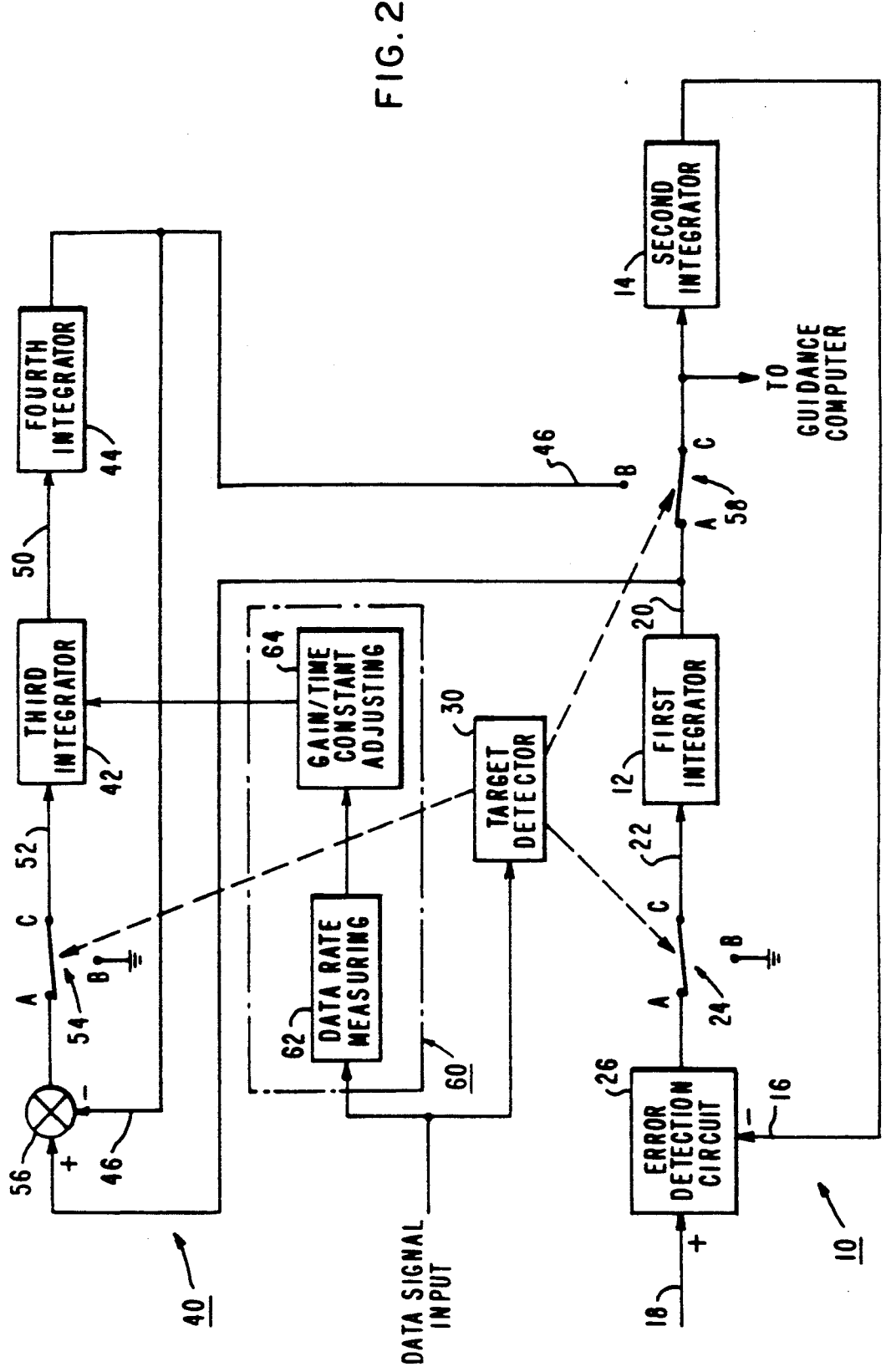
FIG. 2 is a block diagram of a missile seeker according to a preferred embodiment of the present invention.

In FIG. 2, a missile seeker according to the present invention comprises a velocity memory loop 10, an acceleration memory loop 40, a target detector 30, and a stabilizing means 60. The velocity memory loop 10 is a second order tracker having a first integrator 12 and a second integrator 14. An error detection circuit 26 produces a first error signal 22, which is proportional to the difference between an actual line-of-sight 18 and an estimated line-of-sight 16. In one embodiment, the error detection circuit 26 may be a summer which simply computes the sum of the actual line-of-sight 18 and the estimated line-of-sight 16.

A first switch 24, which is controlled by the target detector 30, has a terminal A connected to an output of the error detection circuit 26, a terminal B connected to ground, and a terminal C connected to the input of the first integrator 12. The output of the first integrator 12 is a commanded LOS rate signal 20.

The acceleration memory loop 40 is a second order tracker having a third integrator 42 and a fourth integrator 44. Although represented as an integrator, the third integrator 42 is actually a network which provides integration and a phase lead according to the following response:

$$G(s) = K(1 - Ts)/s$$

where K is a gain constant, and T is a lead time constant. A pole (1/s) provides the integration and the gain constant K establishes the bandwidth of the acceleration memory loop 40. The lead time constant T provides the phase lead and determines the stability of the acceleration memory loop 40.

The commanded LOS rate signal 20, output from the first integrator 12, is summed by a summer 56 with an estimated line-of-sight rate signal 46 to produce a second error signal 52. A second switch which is controlled by the target detector 30, couples the second error signal 52 to the third integrator 42. The second switch 54 has a terminal A connected to the output of summer 56, a terminal B connected to ground, and a terminal C connected to the third integrator 42. The third integrator 42 integrates the second error signal 52 to provide an estimated LOS acceleration signal 50. A third switch 58, which is also controlled by target detector 30, is disposed between the first integrator 12 and the second integrator 14. The third switch 58 has a terminal A connected to the commanded LOS rate signal 20, a terminal B connected to the estimated line-of-sight rate signal 46, and a terminal C connected to the second integrator 14 and the guidance computer.

The stabilizing means 60 includes a data rate measuring means 62 and a gain/time constant adjusting means 64. The data rate measuring means 62 measures the rate at which data signals received by the seeker are fading in and out. Based upon this rate, the gain/time constant adjusting means 62 adjusts the gain constant K and the lead time constant T of the third integrator 42 to maintain stability in the acceleration memory loop 40.

Figure 3:
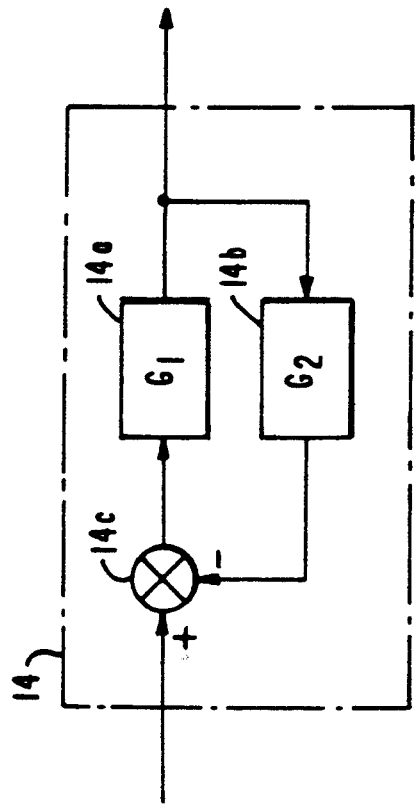
FIG. 3 is a block diagram of a second integrator in a velocity memory loop according to a preferred embodiment of the present invention.

As shown in FIG. 3, the second integrator 14 is more than a mere integrator. The second integrator 14 is a closed loop comprising a forward path block 14a, feedback path block 14b, and a second integrator summer 14c. According to the preferred embodiment (described in Airborne Radar, Povesil, Raven, Waterman et al., pg. 483-4 (1961)), the forward path block 14a comprises an actuator, an amplifier and an antenna and the feedback path block 14b comprises a rate gyro. The second integrator summer 14c provides an angular error for the forward path block 14a.

Functionally, the closed loop of the second integrator 14 controls the antenna in the forward path block 14a to maintain its pointing axis towards the target, despite the motion of the missile body. The closed loop response approximates that of an integrator as shown by the following equation:

$$G_1/(1 + G_1 G_2) \approx 1/K_2 S$$

where $K_2$ is a constant. Therefore, this closed loop is referred to as the "second integrator" without introducing significant error or detracting from the spirit of the present invention.

The following describes the operation of the present invention in reference to FIG. 2, particularly with respect to two situations: during the presence of an adequate data signal (for example, a radar signal, heat signal, any target signal) and during an absence of an adequate data signal.

During the presence of an adequate data signal, target detector 30 detects a target signal and controls the first switch 24, the second switch 54, and the third switch 58 to connect their respective terminals C to their respective terminals A.

In the velocity memory loop 10, the error detection circuit 26 computes the first error signal 22 proportionally to the difference between the actual LOS 18 and the estimated LOS 16. The first integrator 12 receives the first error signal 22 and generates the commanded LOS rate signal 20. Because switch 58 is contacting terminal A, the commanded LOS rate signal 20 is input to the second integrator 14 and the guidance computer. The second integrator 14 uses the commanded LOS rate signal 20 to compute an estimated line-of-sight 16.

Meanwhile, in acceleration memory loop 40, the third integrator 42 estimates a line-of-sight acceleration signal 50 from the second error signal 52, which is the summation of the commanded LOS rate signal 20 computed by the first integrator 12 and the estimated LOS rate signal 46. The fourth integrator 44 generates the estimated LOS rate signal 46 from the estimated LOS acceleration signal 50. However, during the presence of an adequate data signal (i.e., contacting terminal A), the estimated LOS rate signal 46 is not input to the guidance computer.

During an absence of an adequate data signal, target detector 30 fails to detect an adequate target signal and controls the first switch 24, the second switch 54, and the third switch 58 to connect their respective terminals C to their respective terminals B. The first error signal 22 is now zero. Thus, the first integrator 12 stops integrating. Likewise, the second error signal 52 is now zero and the third integrator 42 stops integrating. As a result, the last estimated line-of-sight acceleration signal 50 integrated by the third integrator 42 is preserved, or memorized. The fourth integrator 44 continues to integrate based upon this memorized acceleration.

The estimated LOS rate signal 46 output from the fourth integrator 44 is input via switch 58 to the guidance computer and the second integrator 14. Thus, during the absence of an adequate data signal, the guidance computer is driven based upon the estimated rate of the last commanded line-of-sight rate before losing the data signal.

However, switching back and forth between memory loops due to an intermittent data signal tends to destabilize both loops. To compensate, the data rate measuring means 62 measures the rate at which the data signal is intermittently fading in and out. This measurement can be accomplished by simple timing devices which measure the average time duration that a data signal is present during a sliding time window.

The data rate measuring means 62 controls the gain/time constant adjusting means 64 to adjust the gain constant K and lead time constant T of the third integrator 42 as a function of the measured data signal rate. These adjustments adapt the bandwidth of the third integrator 42 to changes in the data signal rate, thereby maintaining adequate stability in the acceleration memory loop 40, which is also driven by a variable data rate input based on the intermittent data signals.

Figure 1:
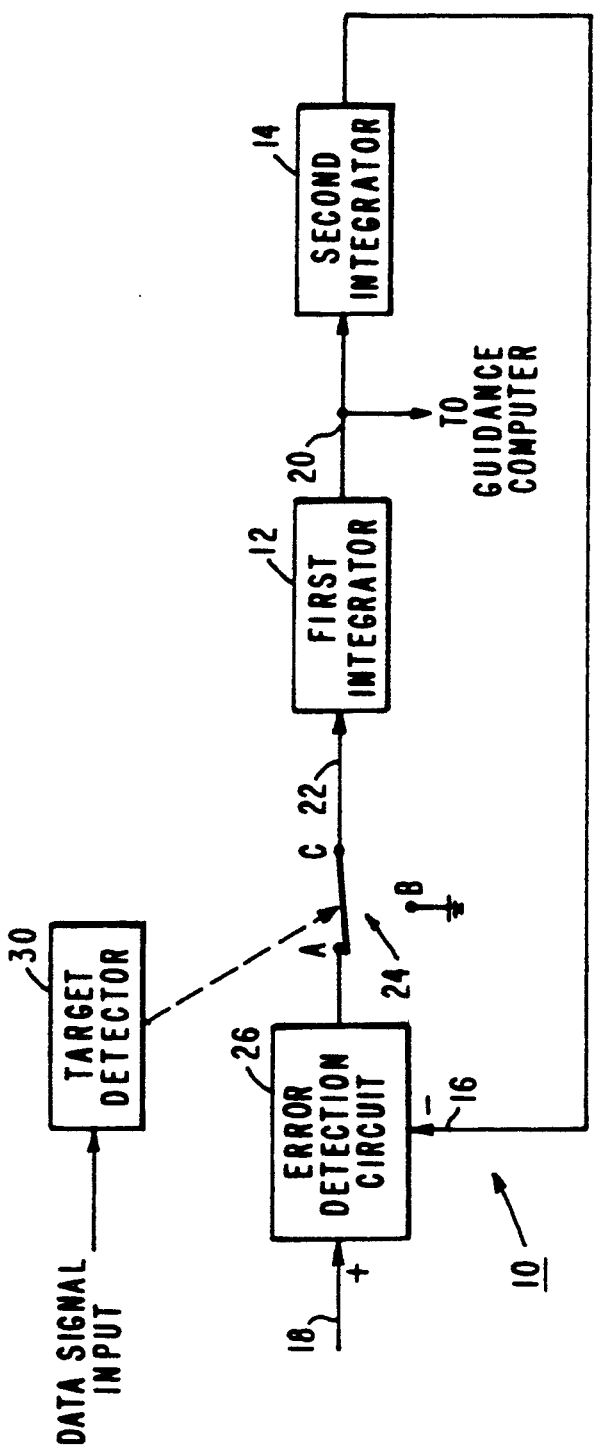
FIG. 1 (PRIOR ART) is a block diagram of a conventional missile seeker.

The velocity memory loop 10 and the acceleration memory loop 40 are similar in that both are second order trackers designed to track their inputs. The velocity memory loop 10 tracks the actual line-of-sight 18, whereas the acceleration memory loop 40 tracks the commanded LOS rate signal 20. The conventional seeker of FIG. 1 employs only a velocity memory loop 10 which provides only the "velocity memory" of the seeker's actual line-of-sight 18.

The present invention, however, by employing the acceleration memory loop 40, provides "velocity memory" of the commanded LOS rate signal 20 (hence, the name "acceleration memory"). The memorized velocity of the commanded LOS rate signal 20 (acceleration memory) of the present invention provides a more accurate and stable line-of-sight rate than the memorized velocity of the seeker's actual line-of-sight 18 according to conventional seekers.

FIG. 4 graphically depicts operational characteristics of a missile seeker employing radar data signals for guidance and demonstrates an advantage of using acceleration memory rather than conventional velocity memory.

The data for the graph is derived from a computer simulation of a generic missile passively homing on a radar employing data starving countermeasures. The data starvation waveform radiates for a period ON and ceases radiation for a period OFF. The graph plots a duty cycle required by the missile to maintain good quality guidance against the period ON time. For the duty cycles shown, the maximum missile miss distance is 50 feet.

As readily shown by the graph, a seeker circuit employing acceleration memory can tolerate a lower duty cycle than a seeker employing only velocity memory.

Specifically, for non-maneuvering targets, acceleration memory requires a lower duty cycle than velocity memory for all emitter ON times greater than approximately 0.2 seconds. For relatively long ON times, acceleration memory tolerates significantly lower duty cycle than velocity memory. A similar situation exists for maneuvering targets.

It is to be understood that the invention is not limited to the disclosed embodiment, but is intended to cover various modifications and equivalent arrangements included within the spirit and scope of the appended claims.

We claim:

1. A seeker circuit for providing guidance data to a guidance computer of a homing missile based upon target data, comprising:
    velocity loop means for computing a first signal;
    acceleration loop means, operatively coupled to receive said first signal, for computing a second signal; and
    detecting means for detecting said target data and for causing said first signal to be input to said guidance computer when said target data is detected and said second signal to be input to said guidance computer when said target data is not detected.

2. A seeker circuit according to claim 1, wherein said velocity loop means comprises first and second integrators and said acceleration loop means comprises third and fourth integrators, and said detecting means controls the inputs of said first, second and third integrators.

3. A seeker circuit according to claim 2, further comprising stabilizing means for said acceleration loop means by adjusting parameters of said third integrator in accordance with variations in said target data.

4. A seeker circuit for homing missile guidance comprising:
    means for inputting an actual line-of-sight;
    an error detection circuit having a first input coupled to said inputting means, a second input, and an output for providing a first error signal;
    a first integrator having an input coupled to receive said first error signal and an output;
    a second integrator having an input coupled to receive the output of said first integrator and an output, wherein the output of said second integrator is fed back to the second input of said error detection circuit;
    a summer having a first input coupled to receive the output of said first integrator, a second input, and an output for providing a second error signal;
    a third integrator having an input coupled to receive said second error signal and an output;
    a fourth integrator having an input coupled to receive the output of said third integrator and an output, wherein the output of said fourth integrator is fed back to the second input of said summer;
    a target detector having an input coupled to receive a data signal input and an output coupled to control the inputs of said first integrator, said second integrator, and said third integrator; and
    stabilizing means having an input coupled to receive the data signal input and an output coupled to said third integrator.

5. A seeker circuit for homing missile guidance according to claim 4, further comprising:
    a first switch having a first terminal coupled to the output of said error detection circuit, a second terminal coupled to ground, and a third terminal coupled to the input of said first integrator;
    a second switch having a first terminal coupled to the output of said summer, a second terminal coupled to ground, and a third terminal coupled to the input of said third integrator; and a third switch having a first terminal coupled to the output of said first integrator, a second terminal coupled to the output of said fourth integrator, and a third terminal coupled to the input of said second integrator.

6. A seeker circuit for homing missile guidance according to claim 5, wherein said target detector controls said first, second and third switches.

7. A seeker circuit for homing missile guidance according to claim 4, wherein said third integrator is a network having a transfer function, $$G(s) = K(1+Ts)/s$$

wherein K is a gain constant and T is a lead time constant.

8. A seeker circuit for homing missile guidance according to claim 7, wherein said stabilizing means adjusts constants K and T in said third integrator.

9. A seeker circuit for homing missile guidance according to claim 4, wherein said stabilizing means comprises:
   data rate measuring means having an input coupled to receive the data signal input and an output; and
   gain/time constant adjusting means having an input coupled to receive the output of said data rate measuring means and an output coupled to said third integrator.

10. A seeker circuit for homing missile guidance according to claim 4, wherein said error detection circuit is a summer.

11. A seeker circuit for homing missile guidance comprising:
   a velocity memory loop comprising:
      a first integrator having an input and an output;
      a second integrator having an input coupled to receive the output of said first integrator and an output; and
      an error detection circuit having a first input coupled to receive a signal indicative of an actual line-of-sight, a second input coupled to receive the output of said second integrator, and an output coupled to the input of said first integrator;
   an acceleration memory loop comprising:
      a third integrator having an input and an output;
      a fourth integrator having an input coupled to receive the output of said third integrator and an output; and
      a summer having a first input coupled to receive the output of said first integrator, a second input coupled to receive the output of said fourth integrator, and an output coupled to the input of said third integrator;
   a target detector having an input coupled to receive a data signal input and an output coupled to control the inputs of said first and second integrators of said velocity memory loop and the input of said third integrator of said acceleration memory loop; and
   stabilizing means having an input coupled to receive the data signal input and an output coupled to said acceleration memory loop.

12. A seeker circuit for homing missile guidance according to claim 11, further comprising:
   a first switch coupled between said error detection circuit and said first integrator;
   a second switch coupled between said summer and said third integrator; and
   a third switch coupled between said first integrator and said second integrator.

13. A seeker circuit for homing missile guidance according to claim 12, wherein said target detector controls said first, second and third switches.

14. A seeker circuit for homing missile guidance according to claim 11, wherein said third integrator is a network having a transfer function, $$G(s) = K(1+Ts)/s$$

wherein K is a gain constant and T is a lead time constant.

15. A seeker circuit for homing missile guidance according to claim 14, wherein said stabilizing means adjusts constants K and T in said third integrator.

16. A seeker circuit for homing missile guidance according to claim 11, wherein said stabilizing means comprises:
   data rate measuring means having an input coupled to receive the data signal input and an output; and
   gain/time constant adjusting means having an input coupled to receive the output of said data rate measuring means and an output coupled to said acceleration memory loop.

17. A seeker circuit for homing missile guidance comprising:
   means for inputting an actual line-of-sight;
   an error detection circuit having a first input coupled to said inputting means, a second input, and an output for providing a first error signal;
   a first switch having a first terminal coupled to the output of said error detection circuit, a second terminal coupled to ground, and a third terminal;
   a first integrator having an input coupled to the third terminal of said first switch and an output;
   a second integrator having an input and an output, wherein the output of said second integrator is fed back to the second input of said error detection circuit;
   a summer having a first input coupled to receive the output of said first integrator, a second input, and an output for providing a second error signal;
   a second switch having a first terminal coupled to the output of said summer, a second terminal coupled to ground, and a third terminal;
   a third integrator having an input coupled to the third terminal of said second switch and an output;
   a fourth integrator having an input coupled to receive the output of said third integrator and an output, wherein the output of said fourth integrator is fed back to the second input of said summer;
   a third switch having a first terminal coupled to the output of said first integrator, a second terminal coupled to the output of said fourth integrator, and a third terminal coupled to the input of said second integrator;
   a target detector having an input coupled to receive a data signal input and an output coupled to control said first, second, and third switches; and
   stabilizing means having an input coupled to receive the data signal input and an output coupled to said third integrator.

18. A seeker circuit for homing missile guidance according to claim 17, wherein said stabilizing means comprises:

data rate measuring means having an input coupled to receive the data signal input and an output; and gain/time constant adjusting means having an input coupled to receive the output of said data rate measuring means and an output coupled to said third integrator.

19. A seeker circuit for homing missile guidance according to claim 18, wherein said third integrator is a network having a transfer function, $$G(s) = K(1 + Ts)/s$$

wherein K is a gain constant and T is a lead time constant, and said gain/time constant adjusting means adjusts constants K and T.

20. A seeker circuit for homing missile guidance comprising:

means for inputting an actual line-of-sight;

an error detection circuit having a first input coupled to said inputting means, a second input, and an output for providing a first error signal;

a first switch having a first terminal coupled to the output of said error detection circuit, a second terminal coupled to ground, and a third terminal;

a first integrator having an input coupled to the third terminal of said first switch and an output;

a second integrator having an input and an output, wherein the output of said second integrator is fed back to the second input of said error detection circuit;

a summer having a first input coupled to receive the output of said first integrator, a second input, and an output for providing a second error signal;

a second switch having a first terminal coupled to the output of said summer, a second terminal coupled to ground, and a third terminal;

a third integrator having an input coupled to the third terminal of said second switch and an output, said third integrator being a network having a transfer function, $$G(s) = K(1 - Ts)/s$$

wherein K is a gain constant and T is a lead time constant;

a fourth integrator having an input coupled to receive the output of said third integrator and an output, wherein the output of said fourth integrator is fed back to the second input of said summer;

a third switch having a first terminal coupled to the output of said first integrator, a second terminal coupled to the output of said fourth integrator, and a third terminal coupled to the input of said second integrator;

a target detector having an input coupled to receive a data signal input and an output coupled to control said first, second, and third switches; and stabilizing means comprising:

data rate measuring means having an input coupled to receive the data signal input and an output; and gain/time constant adjusting means having an input coupled to receive the output of said data rate measuring means and an output coupled to said third integrator;

wherein said gain/time constant adjusting means adjusts constants K and T in said third integrator.

21. A seeker circuit for homing missile guidance comprising:

a velocity memory loop comprising:

a first integrator having an input and an output;

a second integrator having an input and an output;

an error detection circuit having a first input coupled to receive a signal indicative of an actual line-of-sight, a second input coupled to receive the output of said second integrator, and an output coupled to the input of said first integrator;

a first switch coupled between said error detection circuit and said first integrator; and a third switch coupled between said first integrator and said second integrator;

an acceleration memory loop comprising:

a third integrator having an input and an output;

a fourth integrator having an input coupled to receive the output of said third integrator and an output;

a summer having a first input coupled to receive the output of said first integrator, a second input coupled to receive the output of said fourth integrator, and an output coupled to the input of said third integrator; and a second switch coupled between said summer and said third integrator;

a target detector having an input coupled to receive a data signal input and an output coupled to control the inputs of said first and second integrators of said velocity memory loop and the input of said third integrator of said acceleration memory loop; and stabilizing means having an input coupled to receive the data signal input and an output coupled to said acceleration memory loop.

22. A seeker circuit for homing missile guidance according to claim 21, wherein said stabilizing means comprises:

data rate measuring means having an input coupled to receive the data signal input and an output; and gain/time constant adjusting means having an input coupled to receive the output of said data rate measuring means and an output coupled to said third integrator.

23. A seeker circuit for homing missile guidance according to claim 22, wherein said third integrator is a network having a transfer function, $$G(s) = K(1 + Ts)/s$$

wherein K is a gain constant and T is a lead time constant, and said gain/time constant adjusting means adjusts constants K and T.

24. A seeker circuit for homing missile guidance according to claim 21, wherein said target detector controls said first, second and third switches.

25. A seeker circuit for homing missile guidance comprising:

a velocity memory loop comprising:

a first integrator having an input and an output;

a second integrator having an input and an output;

an error detection circuit having a first input, a second input coupled to receive the output of said second integrator, and an output coupled to the input of said first integrator;

a first switch coupled between said error detection circuit and said first integrator; and a third switch coupled between said first integrator and said second integrator;

an acceleration memory loop comprising:
- a third integrator having an input and an output, said third integrator being a network having a transfer function, $$G(s) = K(1+Ts)/s$$

wherein K is a gain constant and T is a lead time constant;
- a fourth integrator having an input coupled to receive the output of said third integrator and an output;
- a summer having a first input coupled to receive the output of said first integrator, a second input coupled to receive the output of said fourth integrator, and an output coupled to the input of said third integrator; and
- a second switch coupled between said summer and said third integrator;

a target detector having an input coupled to receive a data signal input and an output coupled to control said first, second, and third switches; and stabilizing means comprising:
- data rate measuring means having an input coupled to receive the data signal input and an output; and
- gain/time constant adjusting means having an input coupled to receive the output of said data rate measuring means and an output coupled to said third integrator of said acceleration memory loop;

wherein said gain/time constant adjusting means adjusts constants K and T in said third integrator.

* * * * *